(12) United States Patent
Fercher

(10) Patent No.: US 6,243,191 B1
(45) Date of Patent: Jun. 5, 2001

(54) OPTICAL PATH LENGTH MODULATOR

(75) Inventor: Adolf Friedrich Fercher, Vienna (AT)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/240,247

(22) Filed: Jan. 29, 1999

(30) Foreign Application Priority Data

Feb. 3, 1998 (AT) ........................................................ 177/98

(51) Int. Cl.⁷ ............................. G02F 1/155; G02B 5/06; G02B 5/08
(52) U.S. Cl. ........................ 359/266; 359/832; 359/856; 356/346
(58) Field of Search ..................................... 359/832, 856, 359/221, 260, 263, 266; 356/346, 358

(56) References Cited

U.S. PATENT DOCUMENTS

| | | | | |
|---|---|---|---|---|
| 4,681,445 | * | 7/1987 | Perkins | 356/346 |
| 5,457,535 | * | 10/1995 | Schmidtke | 356/364 |
| 5,933,792 | * | 8/1999 | Andersen | 702/32 |

* cited by examiner

*Primary Examiner*—Georgia Epps
*Assistant Examiner*—Michael A. Lucas
(74) *Attorney, Agent, or Firm*—Reed Smith LLP

(57) ABSTRACT

A dynamic optical path length modulator for optical interferometry, holography and tomography is disclosed. The optical path length in a beam path is changed in that the light beam in question is guided through a double mirror arrangement which is formed of two plane mirrors which are parallel to one another and are rotatable about a common axis. A path length-dependent dispersion of any desired magnitude can be introduced into the beam path by the arrangement of plane plates and prisms.

5 Claims, 2 Drawing Sheets

OPTICAL PATH LENGTH MODULATOR

BACKGROUND OF THE INVENTION

1. Field of the Invention

This invention is directed to an optical path length modulator for dynamic change of the optical path length of a light beam in optical interferometry, holography and tomography.

2. Description of the Related Art

In optical interferometry, holography and tomography, an always recurring task consists in dynamically changing the optical path length in a beam path. This can be carried out either in the measurement beam or in the reference beam of the interferometer or interferometric arrangement in holography and tomography. A simple example for a path length modulator of this kind is a moving planar reflector mirror which reflects a light beam impinging normal to the mirror surface. Another example of a path length modulator of this kind is described in International PCT Application WO 92/19930, "Method and Apparatus for Optical Imaging and Measurement" (priority date: Apr. 29, 1991; Inventor: Huang, D.; Fujimoto, J. G.; Puliafito, C. A.; Lin, C. P.; Schuman, J. S.). In this reference, a moving roof prism is used as reflector in order to modulate the path length of the reference light beam in an optical tomography device.

Another simple example for a path length modulator of the type mentioned above is a rotating glass cube which changes the optical path length of a light beam passing through it as a function of its azimuth angle $\alpha$. This is shown in FIG. 1. In this illustration, the light beam 1 traverses the rotating glass cube 2 which is rotatable or rotates about an axis 3 oriented normal to the drawing plane. In this case, the optical path length increases as the angle $\alpha$ increases.

While the rotating glass cube is a very simple and practical method and can also work at high speed, it has the disadvantage that the light beam runs through a medium of glass or another transparent material and is therefore subject to wavelength-dependent differences in the index of refraction, that is, dispersion. Particularly in optical short coherence interferometry and tomography, dispersion has the grave disadvantage that the coherence length of the light beam is increased and the resolution of this process is accordingly worsened.

On the other hand, it is also often necessary in the measuring techniques of optical interferometry, holography and tomography to compensate for dispersion existing in the measurement beam through a dispersion of equal magnitude in the reference beam. In this case, a dispersion determined by the optical media of the measured object and the path lengths prevailing therein must be deliberately simulated in the measurement beam. Moreover, in certain cases, the dispersion realized in the reference beam must be dependent on the change in path length; in many cases, it must again be zero. These requirements can also not be met by the rotating cube. This problem is also not solved by the other path length modulators mentioned above.

OBJECT AND SUMMARY OF THE INVENTION

Therefore, it is the object of the invention to provide an arrangement which makes it possible in a simple manner to change the optical path length for light beams at high speed and, in so doing, to enable any optional dispersion which can also be selected at zero to be introduced in the light beam path.

This object is met according to the invention in that this light beam is guided through a double mirror path length modulator which is formed of two plane mirrors which are parallel to one another and are rotatable or which rotate about a common axis, and the light beam is reflected at a reflector mirror. Dispersive plane plates and prisms of any shape can be arranged in front of this reflector.

The invention is explained with reference to FIGS. 1 to 4.

The reference numbers have the following designations in the Figures:

| | |
|---|---|
| 1 | light beam |
| 2 | glass cube |
| 3 | axis of rotation of the glass cube 2 |
| 4 and 4' | plane mirror of the double mirror arrangement |
| 5 | carrier of the double mirror arrangement |
| 6 | axis of rotation of the path length modulator |
| 7 | reflector mirror |
| 8 | surface normal of the reflector mirror |
| 9 | beam splitter |
| 10 | plane plate or cuvette |
| 11 | light beam |
| 12 | prism or cuvette |
| 14 and 14' | plane mirror of the double mirror arrangement in changed azimuthal orientation relative to positions 4 and 4'. |

DESCRIPTION OF THE PREFERRED EMBODIMENTS

Figure 1:
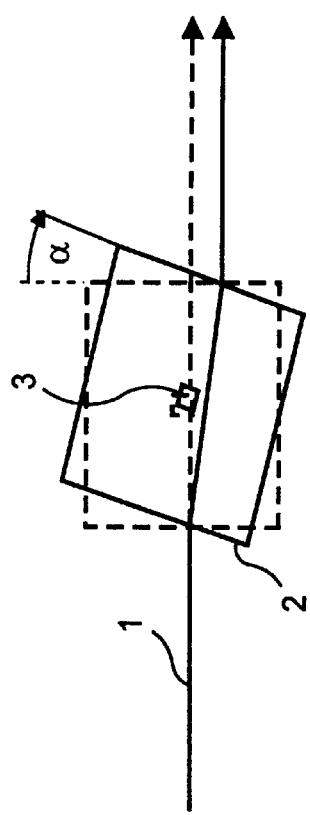
FIG. 1 shows a known method of optical path length modulation.
Figure 2:
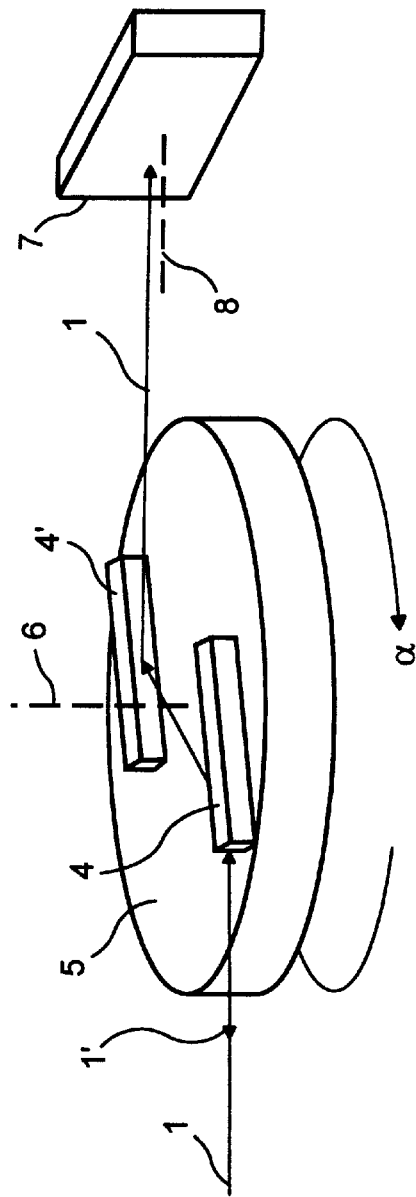
FIG. 2 shows the basic principle of the double mirror path length modulator according to the invention.

FIG. 2 illustrates the basic principle of the invention and shows a first embodiment form of the double mirror path length modulator according to the invention. The light beam 1 initially impinges on a double mirror comprising plane mirrors 4 and 4'. The light beam 1 is reflected from plane mirror 4 to plane mirror 4' and from the latter father in the original direction of the reflector mirror 7. The two plane mirrors 4 and 4' forming the double mirror are parallel to one another and are fastened to a rotating disk 5. The disk 5 and accordingly also the plane mirrors 4 and 4' rotate about the axis of rotation 6. Since the two plane mirrors 4 and 4' are parallel to one another, the beam 1 exits this arrangement parallel to its original direction and strikes the reflector mirror 7. The mirror 7 is oriented with its surface normals 8 parallel to the light beam 1. The light beam 1 is therefore reflected in itself and exits the double mirror arrangement as light beam 1' in the direction opposite to the original direction. The light beam 1 has accordingly traversed an optical path dependent on the rotational angle $\alpha$ of the double mirror arrangement. Since the entire path between the mirrors 4, 4' and 7 extends through air, the light beam is practically not exposed to any dispersion effect.

Figure 3:
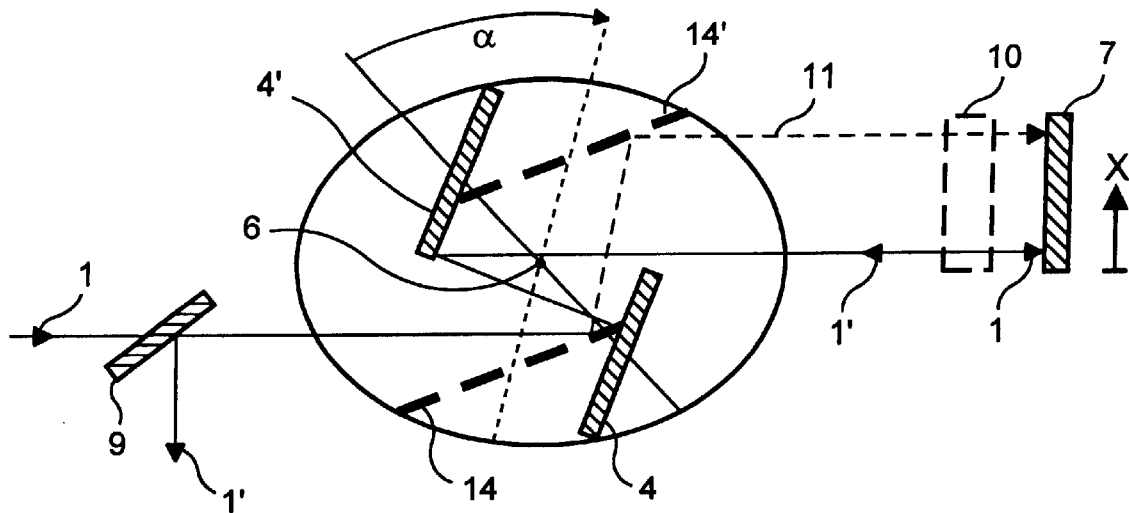
FIG. 3 more fully explains the basic principle and invention, a first embodiment form of the double mirror path length modulator according to the invention.

The arrangement according to the invention is shown in more detail schematically in FIG. 3. In this case, the light beam 1 impinges on the rotating double mirror formed of plane mirror 4 and plane mirror 4' after traversing the beam splitter 9 and, as was already described above, is directed from there to the mirror 7 parallel to the original direction. The beam 1' reflected at the mirror 7 runs back along the same path and is finally divided from the incident beam 1 by the beam splitter 9.

Further, two extreme positions of the double mirror are indicated in FIG. 3; one extreme position shown by a solid line (plane mirror positions 4 and 4') with a greater path length; the other extreme position rotated further in the clockwise direction by azimuth angle α shown by a dashed line (plane mirror positions 14 and 14') and with a short path length. Thus, the path length of the light beams 1 and 1' from the beam splitter 9 via the double mirror to the reflector mirror 7 and back via the double mirror to the beam splitter 9 is changed by the rotating double mirror depending on the azimuth angle α. This is one of the objectives of the arrangement according to the invention.

However, in many cases it is required in addition that the path through which the light beam 1 travels has a fixed amount of dispersion. This can be achieved by arranging a dispersive medium such as glass or a liquid (in a container) in the path of the light beam. This is likewise indicated in FIG. 3: the rectangle 10 shown in dashed lines in this Figure represents a plane plate made of a transparent material or a cuvette filled with a transparent liquid.

As can further be seen from FIG. 3, the light beam 1 is offset in parallel by the rotation of the double mirror. This is shown in FIG. 3 by beam position 11 which is associated with the plane mirror position 14' and is shown in dashed lines. Accordingly, a different position X of the light beam 1 at the reflector mirror 7 is associated with every azimuthal orientation α of the double mirror. When a plane plate 10 or a liquid-filled cuvette is arranged in front of the reflector mirror 7, they are penetrated by light beams 1 and 1'. Thus, a fixed amount of dispersion is introduced in the light path of the light beams 1 and 1. This corresponds to an arrangement according to the invention.

Figure 4:
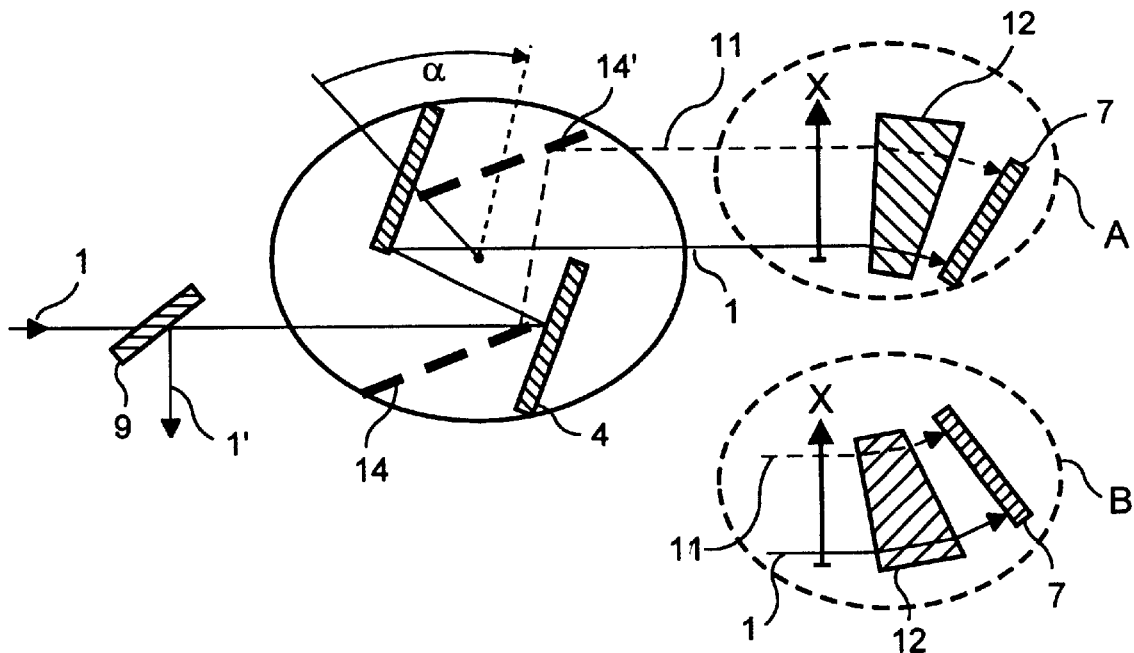
FIG. 4 shows additional embodiments of the arrangement according to the invention.

When a prism 13 or a prism-shaped, liquid-filled cuvette is substituted for the plane plate 10, a dispersion which is dependent on the mirror orientation α and therefore on the path length can be introduced in the double mirror path length modulator. This is shown in FIG. 4. Depending on the orientation of the prism 12, a large dispersion which increases or decreases with the path length can also be realized. These two cases are shown in FIG. 4 by the partial beam paths circled in dashed lines. These arrangements also correspond to the invention.

While the foregoing description and drawings represent the present invention, it will be obvious to those skilled in the art that various changes may be made therein without departing from the true spirit and scope of the present invention.

What is claimed is:

1. An optical path length modulator for dynamic change of the optical path length of a light beam interferometry, holography and tomography, comprising:
    a double mirror path length modulator for guiding the light beam having a path length, said modulator being formed of two plane mirrors which are parallel to one another and are rotatable or rotate about a common axis;
    a reflector mirror by which the light beam is reflected in itself in a reflected light beam
    a dispersion medium located in front of the reflector mirror which introduces a fixed amount of path length dependent dispersion into the light beam and the reflected light beam.

2. The optical path length modulator according to claim 1, wherein the dispersion medium is a plane plate additionally arranged in front of the reflector mirror.

3. The optical path length modulator according to claim 1, wherein the dispersion medium is a liquid-filled cuvette with plane-parallel windows additionally arranged in front of the reflector mirror.

4. The optical path length modulator according to claim 1, wherein the dispersion medium is a liquid-filled, prism-shaped cuvette additionally arranged in front of the reflector mirror.

5. The optical path length modulator according to claim 1, wherein the dispersion medium is a prism additionally arranged in front of the reflector mirror.

* * * * *